(12) United States Patent
Spector (10) Patent No.: US 8,104,075 B2
(45) Date of Patent: Jan. 24, 2012

(54) TRUST MANAGEMENT SYSTEMS AND METHODS

(75) Inventor: Vadim O. Spector, Redwood City, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 847 days.

(21) Appl. No.: 11/836,647

(22) Filed: Aug. 9, 2007

(65) Prior Publication Data

US 2008/0046987 A1 Feb. 21, 2008

Related U.S. Application Data

(60) Provisional application No. 60/822,068, filed on Aug. 10, 2006.

(51) Int. Cl.
*G06F 17/00* (2006.01)
*G06F 7/04* (2006.01)
*G06F 15/16* (2006.01)
*G06F 17/30* (2006.01)

(52) U.S. Cl. ............................................. 726/6; 726/1
(58) Field of Classification Search .................. 726/1, 6
See application file for complete search history.

(56) References Cited

U.S. PATENT DOCUMENTS

| | | | | |
|---|---|---|---|---|
| 5,173,939 | A * | 12/1992 | Abadi et al. ........................... | 1/1 |
| 6,256,734 | B1 * | 7/2001 | Blaze et al. ................... | 713/157 |
| 6,412,070 | B1 * | 6/2002 | Van Dyke et al. .............. | 726/17 |
| 6,460,141 | B1 * | 10/2002 | Olden ............................... | 726/4 |
| 6,772,167 | B1 * | 8/2004 | Snavely et al. ...................... | 1/1 |
| 7,478,421 | B2 * | 1/2009 | Kodimer et al. .................. | 726/4 |
| 2002/0144137 | A1 * | 10/2002 | Harrah et al. ................. | 713/200 |
| 2002/0152254 | A1 * | 10/2002 | Teng .............................. | 709/100 |
| 2004/0260702 | A1 * | 12/2004 | Cragun et al. ................. | 707/100 |
| 2004/0260949 | A1 * | 12/2004 | Aoki et al. .................... | 713/201 |
| 2005/0027871 | A1 * | 2/2005 | Bradley et al. ................. | 709/227 |
| 2005/0149370 | A1 * | 7/2005 | Brown .............................. | 705/8 |
| 2005/0273521 | A1 * | 12/2005 | Patrick et al. ................. | 709/246 |
| 2006/0167863 | A1 * | 7/2006 | Cole et al. .......................... | 707/3 |
| 2006/0248016 | A1 * | 11/2006 | Ginter et al. .................... | 705/54 |

OTHER PUBLICATIONS

PCT International Search Report and Written Opinion mailed Mar. 7, 2008, in related International Application No. PCT/US2007/017794.
Grandison, Tyrone, et al., "A Survey of Trust in Internet Applications," IEEE Communications Surveys and Tutorials, Fourth Quarter 2000, Imperial College, Department of Computing, London, U.K. Jan. 24, 2001, http://www.comsoc.org/pubs/surveys, 30 pages.
Li, Ninghui, "Design of a Role-based Trust-management Framework," IEEE Symposium on Security and Privacy, May 2002, 17 pages.
PCT International Preliminary Report on Patentability dated Feb. 10, 2009 in related International Application No. PCT/US2007/01779, 6 pages.
Office Action dated May 4, 2010 for related China Application No. 200780038027, 6 pages.

* cited by examiner

*Primary Examiner* — Kambiz Zand
*Assistant Examiner* — Aubrey Wyszynski
(74) *Attorney, Agent, or Firm* — Finnegan, Henderson, Farabow, Garrett & Dunner, LLP (57) ABSTRACT

Systems and methods are presented for facilitating the configuration of a trust management framework for use in conjunction with web services, digital rights management systems, and/or other applications. A method for configuring a trust management framework involves providing graphical user interfaces (GUIs) to a user that prompt the user to define certain aspects of the trust management framework in a self-consistent manner. In one embodiment, a method comprises providing a roles GUI that prompts a user to define roles, a services GUI that prompts the user to define services corresponding to the roles, a principals GUI that prompts the user to define principals, including associating at least one of the roles with a principal, and a nodes GUI that presents role bindings for principals that are designated to function as nodes and that prompts the user to define interactions between nodes.

35 Claims, 11 Drawing Sheets

FIG.11 ional Application No. 60/822,068, filed Aug. 10, 2006, which is hereby incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As network and computer security increases in importance, the design and implementation of a robust trust management framework has become a more important part of the creation of networked services and other applications. However, the design and implementation of a trust management framework is often relatively unrelated to the functionality of the services and applications that rely on it, and, as a result, the architects of such services or applications may lack the specialized knowledge to design and implement a trust management framework in an efficient, correct manner.

Trust management can entail the use of various building blocks, such as cryptography, the public key infrastructure, digital certificates (and the chaining thereof), security assertion markup language (SAML) assertions (e.g., to define roles), and the like. In general terms, a trust management framework typically defines how a system verifies that entities are who they say they are and ensures that entities are only allowed to perform the actions that they are authorized to perform. Configuring a self-consistent, secure trust management framework can be a complex task, since, in a given system, there will typically be a variety of entities with overlapping roles and authorizations.

SUMMARY

Systems and methods are presented for facilitating the configuration of a trust management framework for use in conjunction with web services, digital rights management systems, and/or other applications. For example, without limitation, the systems and methods described herein can be used to assist various stakeholders interested in employing technology, such as the Networked Environment for Media Orchestration (NEMO) service orchestration technology described in commonly assigned U.S. patent application Ser. No. 10/863,551 (Publication No. 2005/0027871) ("the '551 application"), and/or the digital rights management ("DRM") technology described in commonly assigned U.S. patent application Ser. No. 11/583,693 (Publication No. 2007/0180519) ("the '693 application") for designing and implementing, e.g., secure DRM systems. The '551 application and the '693 application are hereby incorporated by reference into this application in their entirety.

In one embodiment, a method for configuring a trust management framework for use in a network environment involves providing various graphical user interfaces to a user that prompt the user to define certain aspects of the trust management framework. In particular, a method for configuring a trust management framework for use in a network environment comprises providing a roles graphical user interface that prompts a user to define roles, providing a services graphical user interface that prompts the user to define services corresponding to the roles, providing a principals graphical user interface that prompts the user to define principals, including associating at least one of the roles with a principal, and providing a nodes graphical user interface that presents role bindings for principals that are designated to function as nodes and that prompts the user to define interactions between nodes. In one embodiment, the method ensures that the trust management framework is configured in a self-consistent manner. For example, at many points, the configuration graphical user interfaces present a user with a set of options to select from. To ensure self-consistency, the options are limited to only valid options, where the validity of the selection options is based on previous configuration decisions.

In one embodiment, a system for configuring a trust management framework for use in a network environment includes a roles module, a services module, a principals module, and a nodes module. The roles module prompts a user to define roles. The services module prompts the user to define services corresponding to the roles. The principals module prompts the user to define principals, including associating at least one of the roles with a principal, the nodes module presents role bindings for principals that are designated to function as nodes and prompts the user to define interactions between nodes.

Other aspects and advantages of the inventive body of work will become apparent from the following detailed description, taken in conjunction with the accompanying drawings, illustrating by way of example the principles of the inventive body of work.

BRIEF DESCRIPTION OF THE DRAWINGS

The inventive body of work will be readily understood by referring to the following detailed description in conjunction with the accompanying drawings, wherein like reference numerals designate like elements and in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Systems and methods are presented for facilitating the configuration of a trust management framework for use with web services, digital rights management systems, and/or other applications. For example, without limitation, the systems and methods described herein can be used to assist various stakeholders interested in employing technology, such as the Networked Environment for Media Orchestration (NEMO) service orchestration technology described in the '551 application, and/or the digital rights management technology described in the '693 application for designing and implementing, e.g., secure DRM systems. It will be appreciated that these systems and methods are novel, as are many of the components, systems, and methods employed therein.

As described in more detail in the '551 application, trust management can entail the use of various building blocks, such as cryptography, the public key infrastructure, digital certificates (and the chaining thereof), security assertion markup language (SAML) assertions (e.g., to define roles), and the like. In general terms, a trust management framework is typically concerned with defining how a system verifies that entities are who they say they are and ensuring that entities are only allowed to perform the actions that they are authorized to perform. Defining a self-consistent, secure trust management framework can be a complex task, since, in a given system, there are typically a variety of entities with overlapping roles and authorizations.

In preferred embodiments, a configuration tool (sometimes referred to herein simply as "the tool") is used to facilitate the configuration of a trust management framework for use with web services, digital rights management systems, application programs, and/or the like. Embodiments of the configuration tool can be valuable in presenting complex networks (such as those described in the '551 application, and/or any other suitable network) in an intuitive, graphical form that makes it easier to grasp the relations between the various system elements.

Embodiments of the configuration tool can help system architects by continuously validating a trust management framework for internal consistency as the trust management framework is being configured, and by capturing the configuration in an unambiguous, computer- and human-readable form.

Embodiments of the configuration tool can enhance the productivity of system implementers. From the network model produced by the design process, the configuration tool can be used to automatically generate all trust management credentials for all NEMO principals. In some embodiments, the configuration tool can also be used to generate a default Java-based project with stub code for applications and services implied by the model, such that a quickly realizable implementation is able to perform live interactions between NEMO nodes as defined by the model. Thus, embodiments of the configuration tool can help developers to quickly obtain the working baseline functionality, thereby enabling the developers to concentrate on implementing the business logic for NEMO services and consumer applications, while remaining agnostic to the trust management issues which, in the absence of the configuration tool, might otherwise consume a large share of the development effort.

Figure 1:
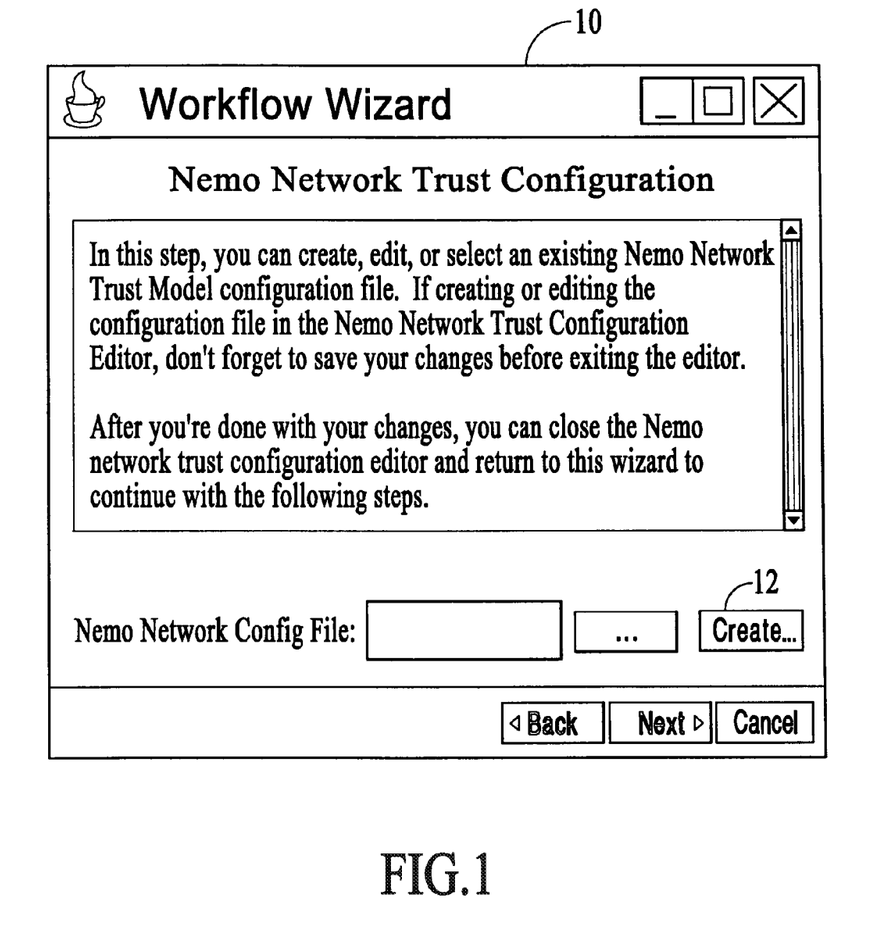
FIG. 1 shows an example of a workflow wizard for configuring a trust management framework.

In one embodiment, the configuration tool includes a trust management editor that guides a user through the configuration of a trust management framework. FIG. 1 shows an example of a workflow wizard dialog 10 that allows a user to configure a new trust management framework or to modify the configuration of an existing trust management framework. In the example shown in FIG. 1, selecting the "Create..." button 12 of the workflow wizard causes the user to be presented with an application domain configuration editor, also referred to herein as the trust management editor.

Figure 2:
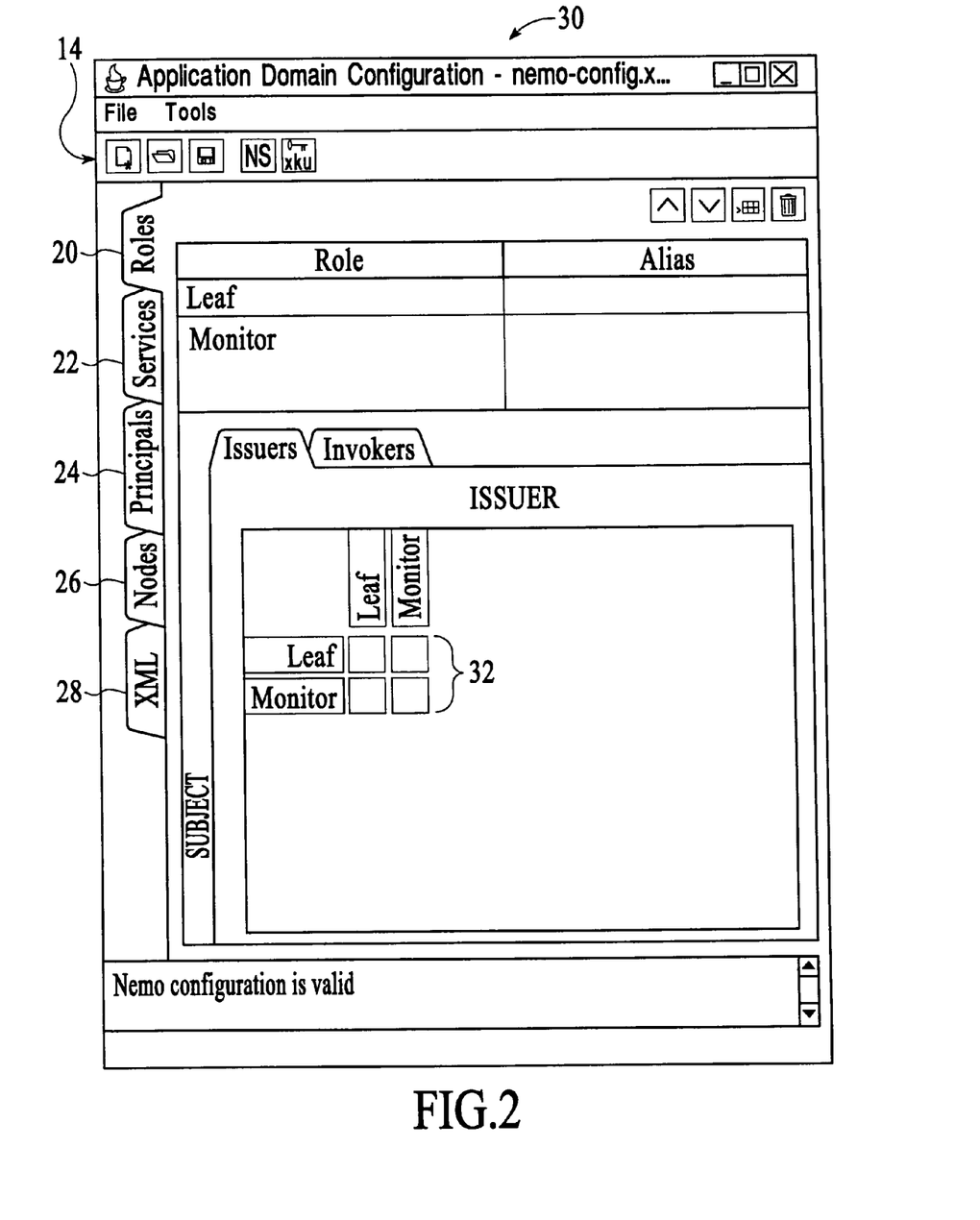
FIG. 2 depicts a Roles GUI for defining certain attributes of a role issuer.

In a preferred embodiment, the trust management editor includes four main modules that are presented to the user through function-specific graphical user interfaces (GUIs). The function-specific GUIs include a Roles GUI, a Services GUI, a Principals GUI, and a Nodes GUI. An embodiment of the trust management editor is described with reference to FIGS. 2-8. With reference to FIG. 2, the trust management editor includes a tool bar 14 and function-specific tabs 20, 22, 24, 26, and 28. The tool bar provides access to common application operations, including, for example, file management operations and some application-specific operations such as namespace (NS) and extended key usage (XKU) operations. The function-specific tabs are used to launch the function-specific GUIs. The function-specific GUIs and their associated functions are described below with reference to FIGS. 2-8.

Roles GUI

FIG. 2 depicts an embodiment of the trust management editor in which the Roles GUI 30 is displayed. The Roles GUI prompts a user to define roles. In one embodiment, a role is a set of services that a given peer exposes in combination with a specific behavior pattern. In this embodiment, the Roles GUI includes a two-column Role Name editor with the left column labeled as the "Role" column and the right column labeled as the "Alias" column. The "Role" column is configured to be populated with a list of role names and the "Alias" column is configured to be populated with corresponding role aliases. In a preferred embodiment, role aliases are optional and if defined, they are used to display role names in shorter form. In the embodiment of FIG. 2, roles identified as the "Leaf" role and the "Monitor" role are defined. For this example, the Leaf role is a client-only role that exposes no services and the Monitor role is a role that exposes one service, which is described in more detail below.

In the embodiment shown in FIG. 2, the Roles GUI also includes Issuers and Invokers tabs, which, when selected, present the user with a corresponding Issuers or Invokers matrix. FIG. 2 depicts the Roles GUI with the Issuers matrix 32 selected. The Issuers matrix is used to define what roles can be asserted by what roles. In one embodiment, a role assertion identifies what role "X" a principal should possess, in order to be entitled to issue a role assertion for role "Y" to other principals. For example, "X" corresponds to an "Issuer Role", while "Y" corresponds to a "Subject Role". In the embodiment of FIG. 2, the Issuers matrix includes Issuer roles on the x-axis and Subject roles on the y-axis and each axis of the matrix is automatically populated with each role that is defined in the Role Name editor. Interactions between roles are identified by marking the intersection point between an Issuer role and a Subject role and in the embodiment of FIG. 2, marking the intersection point between an Issuer role and a Subject role indicates that the marked Issuer role can assert the marked Subject role. That is, a marking at the intersection between an Issuer role and a Subject role defines what role, as indicated in the x-axis, should a role issuer have in order to assert the Subject role, as indicated in the y-axis. Note that in the embodiment shown in FIG. 2, only a subset of the defined roles happens to correspond to role issuers; other roles may refer to the roles used by NEMO nodes to authorize access to various NEMO services. In one embodiment, this is due to overloading of the notion of "Role", resulting in two separate matrices—"Issuers" and "Invokers". The latter describes interactions (invocations) between nodes, playing different roles. The former—how those roles get assigned in the first place. Sometimes roles have both functions. For example, services with the role "A" may issue role "B" assertions to the clients with the role "C". In this example, the Issuers matrix defines a {"A", "B"} tuple, indicating that role "A" may assert role "B". At the same time, the "Invokers" matrix defines a {"C", "A"} tuple, meaning that any client with the role "C" may contact a service with the role "A"—most naturally, to ask for granting a new, role "B", assertion, to gain more capabilities as a participant in a given trust management ecosystem.

Figure 3:
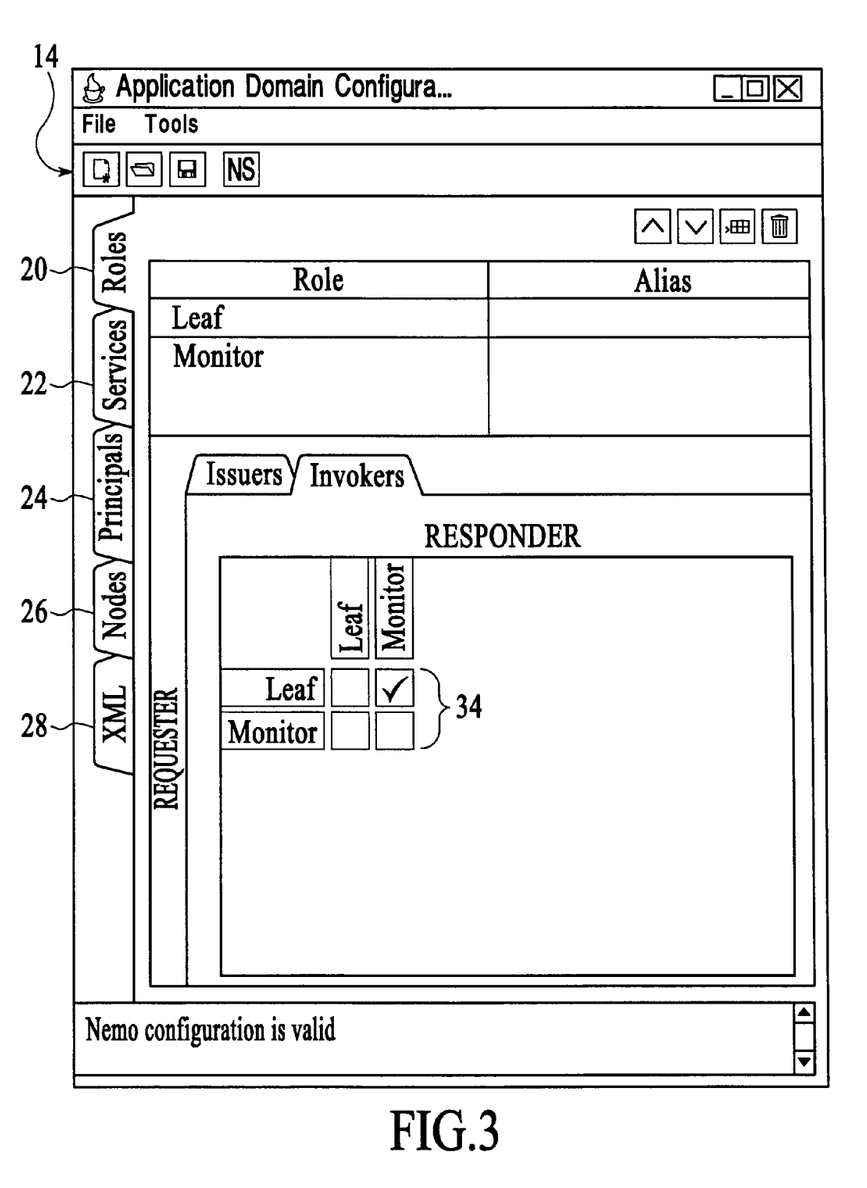
FIG. 3 depicts a Roles GUI for defining certain attributes of a role invoker.

FIG. 3 depicts the Roles GUI 30 with the Invokers matrix selected. The Invokers matrix 34 is used to define the relationship between Requester and Responder roles. In the embodiment of FIG. 3, the Invokers matrix includes Requestor roles on the y-axis and Responder roles on the x-axis and again each axis of the matrix is automatically populated with each role that is defined in the Role Name editor. Interactions between roles are identified by marking the intersection point between a Requestor role and a Responder role and in the embodiment FIG. 3, marking the intersection point between a Requestor role and a Responder role indicates that the marked Requester role can invoke the marked Responder role. That is, a marking at the intersection point between a Requester role and a Responder role defines what role, as identified in the x-axis, is required for one node to invoke a service on another node acting in the role, as identified in the y-axis. In the example of FIG. 3, the checked box indicates that the Leaf role (Requestor) can invoke the Monitor role (Responder).

With the Roles GUI 30, a user is free to name any roles and to define the relationships between roles in any fashion. As is described below, the relationships specified in the Issuers and Invokers matrices are reflected in subsequent configuration operations. The graphical representation of the relationships between roles, as graphically expressed through the matrices, is one of the features that makes the trust management tool user friendly. Although the roles GUI uses the Issuers and Invokers matrices as depicted in FIGS. 2 and 3 to graphically depict the relationship between roles, other forms of presentation are possible.

Figure 4:
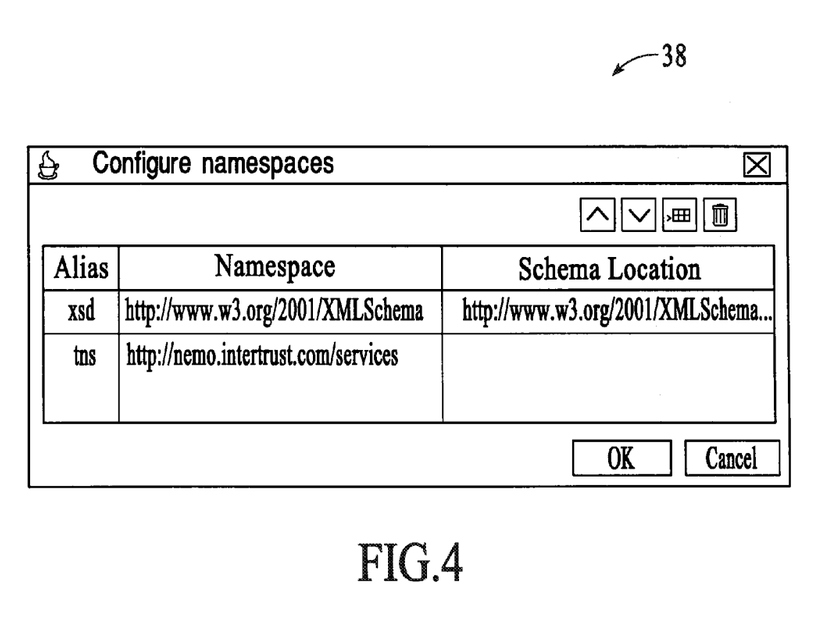
FIG. 4 depicts a namespace configuration editor.

Once the roles are named and the role relationships are specified, services can be configured for the roles. In one embodiment, prior to configuring per-role services, the user is prompted to launch a namespaces configuration editor. The namespaces configuration editor prompts a user to define namespaces for schema types of all request and response message payloads defined for services and their operations. FIG. 4 depicts an embodiment of a namespaces configuration editor 38 that is launched by pressing the "NS" button on the tool bar of the trust configuration editor (see FIGS. 2 and 3). In the embodiment of FIG. 4, the namespaces configuration editor includes "Alias," "Namespace," and "Schema Location" columns. The "Alias" column is used to define an alias for each namespace, the "Namespace" column is used to define the namespace of an XML schema, and the "Schema Location" column is used to define the location of the schema for the corresponding namespace. Once the namespaces are configured, the user is returned to the active function-specific GUI by selecting the "OK" button.

Services GUI

Figure 5:
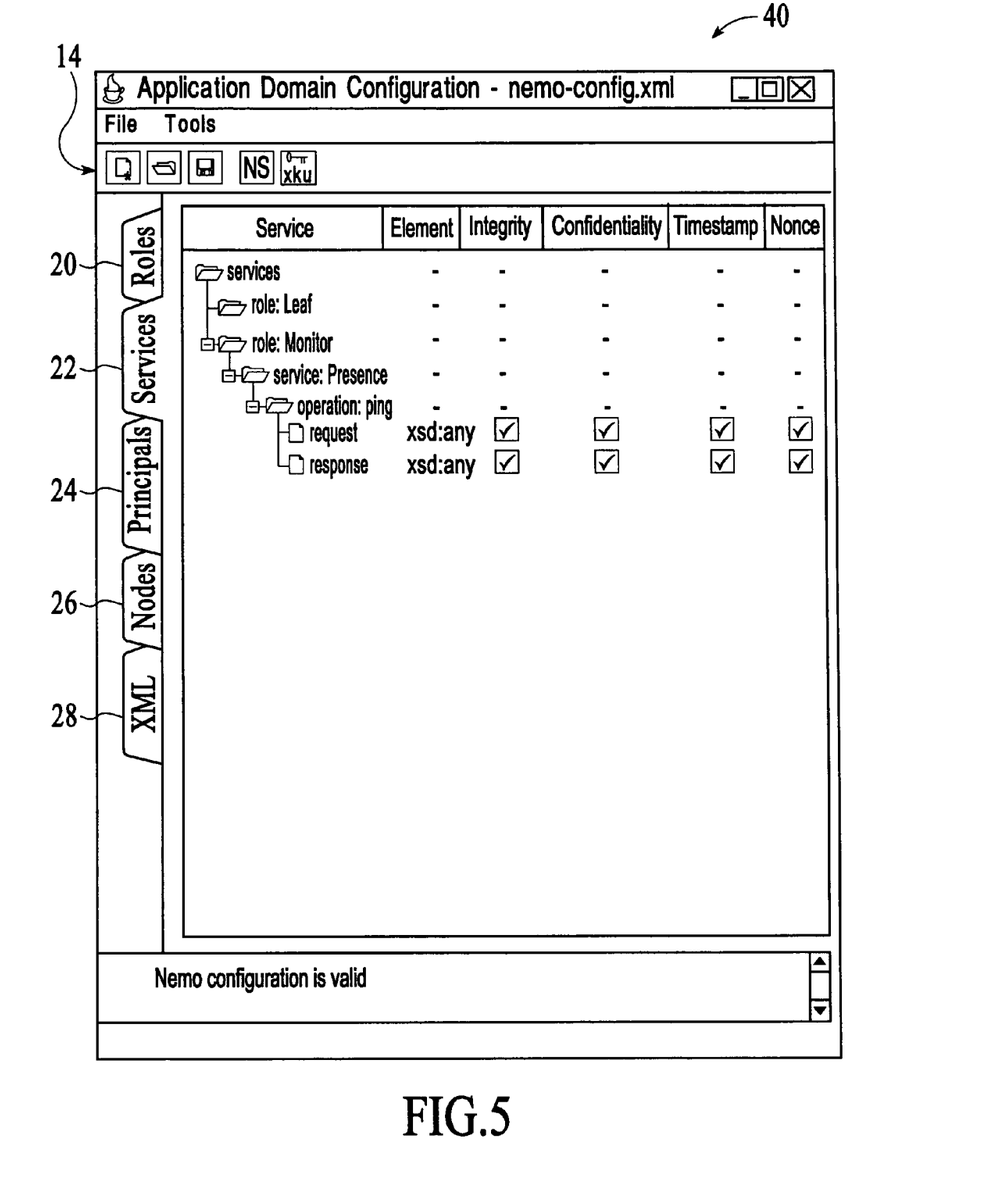
FIG. 5 depicts a Services GUI for defining services.

In one embodiment, after the roles and the namespaces have been defined, the Services tab 22 is selected to launch the Services GUI. FIG. 5 depicts an embodiment of the trust management editor in which the Services GUI 40 is displayed. The Services GUI includes a services editor that prompts a user to define services corresponding to the roles that were defined via the Roles GUI. A service encapsulates the representation of a set of well-defined functionality exposed or offered by a responder Node. In one embodiment, the Services GUI is pre-populated with the roles that were previously defined via the Roles GUI 30 (for example, the "Leaf" and "Monitor" roles that were defined in FIG. 3). For each role, the user may define the set of services that are exposed by a node with the corresponding role. Note, that some roles may have no corresponding services because they are either issuer roles or client-only roles. The exemplary service depicted in FIG. 5 is a "Presence" service whose function is to ensure that a node is available. It should be noted that the number and type of services associated with the roles is application-specific. The software code associated with the specified services is embodied in service-specific software modules. Development of service modules for peer-to-peer interactions is described, for example, in the '551 application.

Each service can have one or more corresponding operations and each operation can have different messaging characteristics that can be defined. In the embodiment of FIG. 5, the Services GUI 40 prompts the user to define certain messaging characteristics related to trust management. The characteristics are organized into columns within which the user can make certain specifications. The particular messaging characteristics presented in the Services GUI of FIG. 5 are:

(a) "Element" field—XML element type representing the XML schema type of the message payload;

(b) "Integrity" checkbox—an indication of whether or not the message must be integrity-protected (e.g., digitally signed);

(c) "Confidentiality" checkbox—an indication of whether or not the message must be confidential (e.g., encrypted);

(d) "Timestamp" checkbox—an indication of whether or not the message must be time-stamped;

(e) "Nonce" checkbox—an indication of whether or not the message must include a nonce (number once) to guarantee its uniqueness.

In the embodiment of FIG. 5, the Services GUI 40 organizes the roles, corresponding services, and corresponding operations in a hierarchical manner using folders and subfolders to graphically represent the relationships between the various roles, the corresponding services, and the corresponding operations. The graphical representation of the relationships between roles, services, and operations and the associated messaging characteristics is one of the features that makes the trust management editor more user friendly than having to write service-related code for each new service and read through lines of configuration code to decipher similar relationships and characteristics.

Principals GUI

Figure 6:
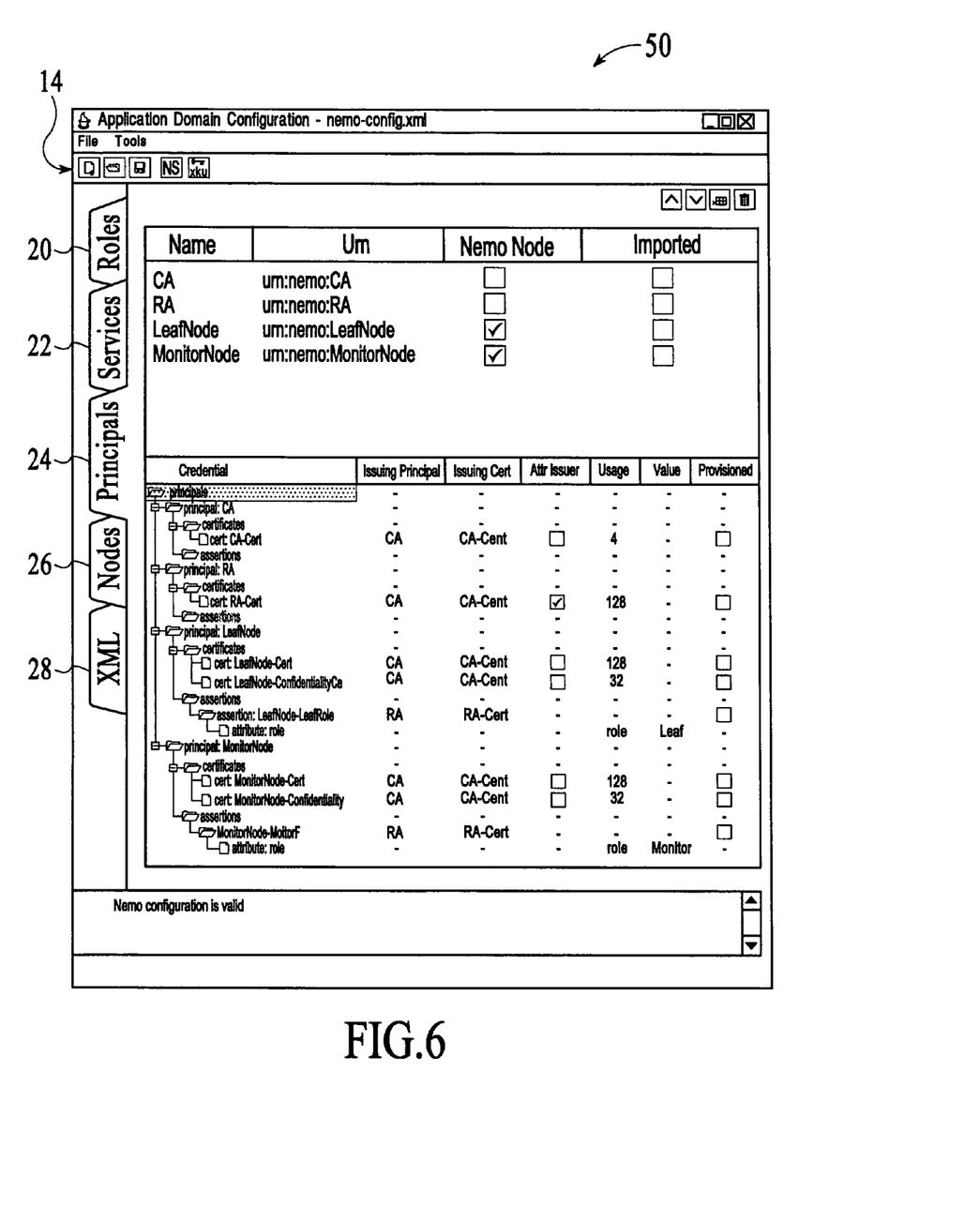
FIG. 6 depicts a Principals GUI for defining principals and their credentials.

The Principals tab 24 is selected to launch the Principals GUI. FIG. 6 depicts an embodiment of the trust management editor in which the Principals GUI 50 is displayed. In one embodiment, a Principal is an entity that has a unique identity. That is, a Principal roughly corresponds to a notion of a single identity, but how this identity is established is domain-specific. For example, both X.509 certificates and SAML assertions have a notion of a "subject", to whom they are issued.

Subject name is part of those credentials' content, and it should be the same for a given Principal. However, other credentials may have no subject, e.g. secret keys. Once any private credential leaks, this Principal may be impersonated.

The Principals GUI 50 prompts a user to define principals of the trust management framework, including associating at least one of the previously defined roles with a principal and supplying the principals with credentials that are appropriate for their intended use within the trust management framework. In the embodiment of FIG. 6, the Principals GUI includes a Principals Name editor and a Principals Credentials editor. The Principals Name editor includes a "Name" column, a "URN" column, a "NEMO Node" column, and an "Imported" column. The columns of the Principals Name editor prompt a user to identify the following information for each principal that is defined:

Name—a short, user-friendly name that is used elsewhere in the tool to reference the principal;

URN—the Uniform Resource Name (URN) used in credentials issued for/by the corresponding principal;

NemoNode—whether the corresponding principal is a NEMO node. If the principal is not a NEMO node then in one embodiment the principal is to be only a credentials issuer;

Imported—whether the corresponding principal is an internal principal to be defined and provisioned as part of the designed system or a pre-existing external principal, whose credentials must be imported and used inside the designed system. Since the present example is a description of the configuration of an entire trust management framework from scratch, this box is un-checked in this example.

In one embodiment, the Principals Name editor may include a column that prompts a user to identify how many times the principal is to be replicated. In further embodiments, the Principals Name table may include additional replication information such as the starting identifier for the principal that is to be replicated. In the case where a principal is to be replicated, the URN of the principal will include a floating character to indicate where a unique identifier is to be inserted. For example, if a principal is to be replicated 100 times starting at ID=1, each principal will have a URN that includes the same URN except for the ID, with the ID of the 100 different principals ranging from 1-100. This feature can be applied to production environments where multiple similar devices are being produced, with each device requiring a different URN.

In the example of FIG. 6, the principals "CA," "RA," "LeafNode," and "MonitorNode" are defined. In this example, the principal CA is defined to act as a certificate authority, the principal RA is defined to act as a role assertion authority. For example, any Principal, which has one or more certificates capable of signing other certificates, is the CA (for X.509 certificates, it is key usage 4—"certificates signing"). Any Principal, which has one or more certificates capable of data signing (key usage 128—"data signing") PLUS this certificate is marked in the GUI as an attribute issuer, becomes a Role Authority (RA). So, a Principal obtains its capabilities from its credentials. The principal LeafNode is defined to carry out the Leaf role, and the principal MonitorNode is defined to carry out the Monitor role.

In one embodiment, the credentials of principals that are defined in the Principals Name editor are defined via the Principals Credentials editor. In a preferred embodiment, there are two kinds of credentials, certificates and assertions, where, for example, a certificate binds a name to a public key and an assertion binds a name to a role. In the embodiment of FIG. 6, the Principals GUI 50 prompts a user to identify the credentials of a principal in terms of the following characteristics:

Issuing Principal—the principal from which a certificate is issued

Issuing Certificate—the name of the certificate from which the current certificate is issued Attribute Issuer—whether or not the certificate can function as an attribute issuer Usage—a code value that represents what the certificate can be used for (e.g., standard enumerated key usages for X.509 certificates).

Value—defines extended key usages for each certificate. For example, in one embodiment, the Value field could be a context-dependent field triggering pop-up dialog with more detailed information for each credential type. For certificates, the Value field may provide information like key usage, validity dates, XKUs, etc. For SAML assertions, the Value field may include a list of all attribute names and their values, validity interval, etc.

Provisioned—indicates whether a Principal gets originally provisioned with these credentials, or acquires them during operations in the field.

In one embodiment, each principal that is intended to be used as a certificate authority is supplied with at least one certificate with the key usage for certificate issuing (e.g., usage=certificate issuing). The certificate name should be picked as a short user-friendly name used for reference elsewhere in the tool. Each principal intended to be used as a role issuer is supplied with at least one certificate for role signing (usage=data signing) and zero or more role assertions, if some role issuing rules were defined earlier. In one embodiment, each principal that is identified as a NEMO node has at least two certificates, one for data signing and one for key encryption, to support message integrity and confidentiality respectively.

In a preferred embodiment, attribute assertions are populated with attributes. For example, an assertion "asserts" certain information about its subject (Principal). Trust to an assertion is based on trust to its signer (assertion issuer). Attribute assertions consist of one or more attributes. In one embodiment, each attribute has a name and zero or more values. Role assertion is just a simple case of an assertion with a single attribute "role" and one or more values (role names). In one embodiment, all attributes come with the "role" attribute name by default. In one simplified embodiment, this is the only attribute playing a role in trust management. In one embodiment, to ensure self-consistency during configuration, the Principals Credentials table is programmed to only allow the selection of the previously defined roles as a valid attribute assertion.

Referring to the Principal Credentials table in the example of FIG. 6, the principal "CA" has one certificate that is identified as "CA-Cert," an Issuing Principal identified as "CA," an issuing certificate identified as "CA-Cert," and a usage of 4, where 4=certificate signing. The principal "RA" has one certificate identified as "RA-Cert," an Issuing Principal identified as "CA," an issuing certificate identified as "CA-Cert," and a usage of 128, wherein 128=data signing. The Principal "RA" is also identified as an attribute issuer.

The principal "LeafNode" includes two certificates, "LeafNode-Cert" and "LeafNode-ConfidentialityCert" and one assertion, "LeafNode-LeafRole." The certificate "LeafNode-Cert" has an Issuing Principal "CA," an issuing certificate "CA-Cert," and a usage of 128 and the "LeafNode-ConfidentialityCert" has an Issuing Principal "CA," an issuing cert "CA-Cert" and a usage of 32, where 32=encryption. In one example embodiment, an Issuing Cert is any certificate with the key usage 4 (certificate signing). Correspondingly, an Issuing Principal is a principal that possesses at least one Issuing Certificate. The assertion "LeafNode-LeafRole" has an issuing principal "RA" and the attribute of the previously defined "Leaf" role. In one embodiment, in the usage field, a user is presented only with the previously defined roles as valid selection options. This feature helps to guide the user to a self-consistent and valid configuration.

In the example shown in FIG. 6, the principal "MonitorNode" includes two certificates, "MonitorNode-Cert" and "MonitorNode-ConfidentialityCert" and one assertion, "MonitorNode-MonitorRole." The certificate "MonitorNode-Cert" has an Issuing Principal "CA," an issuing certificate "CA-Cert," and a usage of 128 and the "MonitorNode-ConfidentialityCert" has an Issuing Principal "CA," an issuing cert "CA-Cert," and a usage of 32. The assertion "MonitorNode-MonitorRole" has an issuing principal "RA" and the attribute of the previously defined "Monitor" role.

Figure 7:
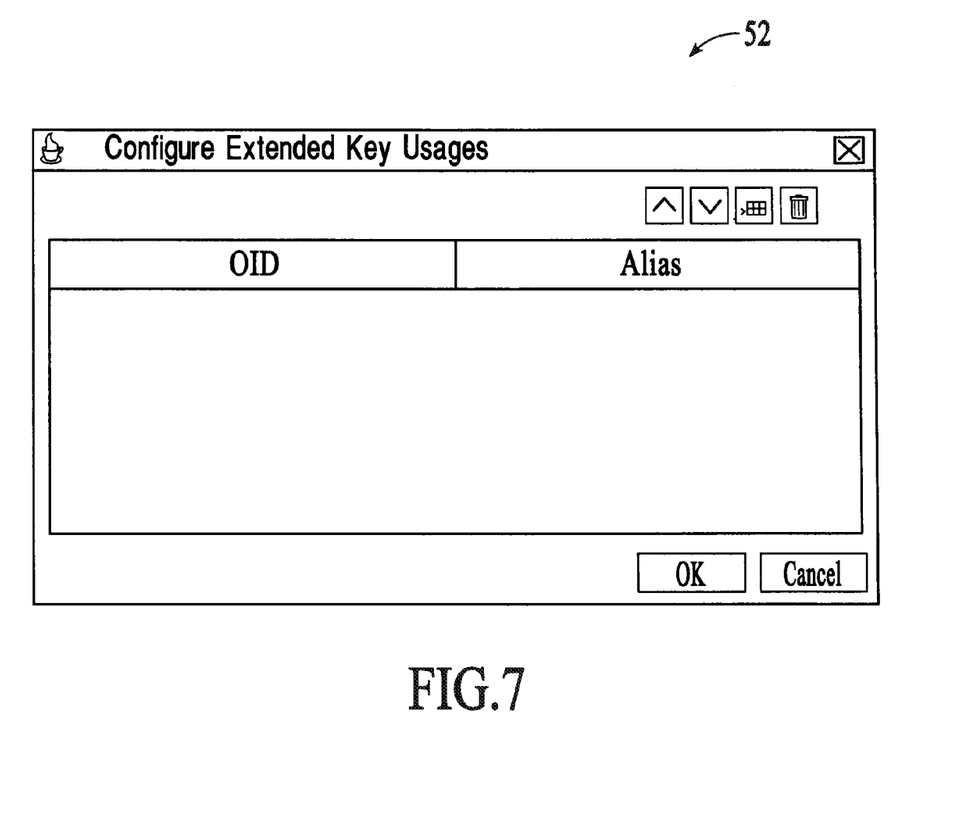
FIG. 7 depicts an extended key usage editor for defining extended key usages.

In one embodiment, extended key usages are defined using an extended key editor, which is launched by selecting the "XKU" button depicted in the tool bar 14 of the trust configuration editor. FIG. 7 depicts an embodiment of an extended key editor 52 that includes an "OID" column and an "Alias" column. The OID column defines the object identifier (OID) valid for extended key usages. The Alias column defines short, user-friendly aliases used elsewhere in the tool.

Referring back to FIG. 6, the Principals Credentials table of the Principals GUI 50 organizes the Principals and corresponding credentials (certificates and assertions) in a hierarchical manner using folders and subfolders to graphically represent the relationships between the various Principals and the corresponding credentials. Further, the configurable characteristics of the credentials are graphically displayed for each Principal. The graphical representation of the relationships between Principals and credentials and the associated credential characteristics makes the trust management editor more user friendly than having to write program code to configure each Principal or read through lines of configuration code to decipher similar relationships and characteristics.

In the example shown in FIG. 6, and the Principals GUI 50 in particular, the order of principals is important, in order to avoid circular dependencies, like A signs B, B signs C, C signs A. Accordingly, the list of available Issuing Principals and Issuing Certificates, available for each principal's certificate, is populated from the earlier created list of principals (and, therefore, their credentials).

Nodes GUI

Figure 8:
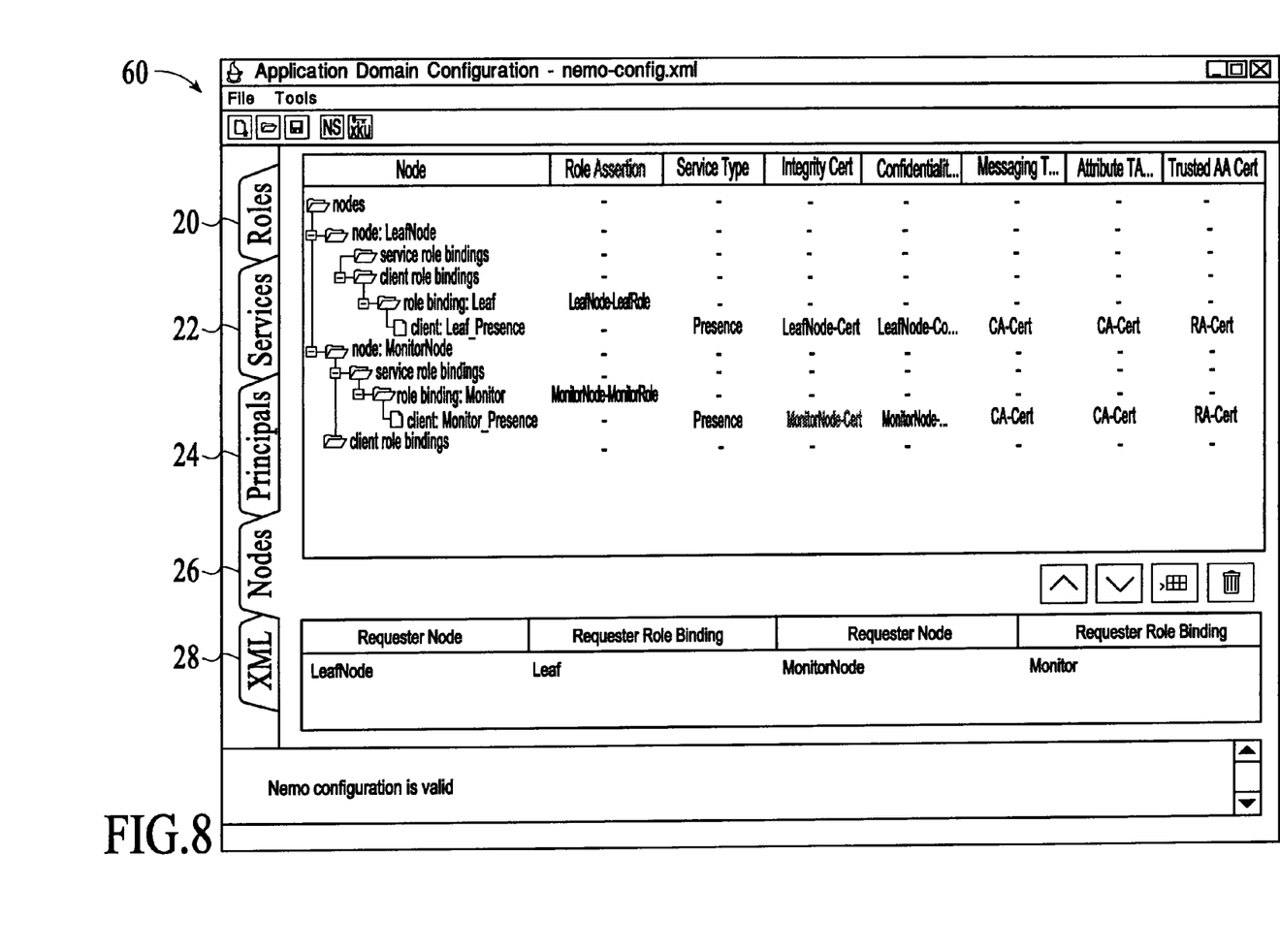
FIG. 8 depicts a Nodes GUI for defining nodes.

The Nodes tab 26 is selected to launch the Nodes GUI. FIG. 8 depicts an embodiment of the trust management editor in which the Nodes GUI 60 is displayed. A node is a representation of a participant in the system framework. A node may act in multiple roles including that of a service consumer and/or a service provider. Nodes may be implemented in a variety of forms including consumer electronics devices, software agents such as media players, or virtual service providers such as content search engines, DRM license providers, or content lockers. The Nodes GUI presents role bindings for principals that are designated to function as nodes (e.g., NEMO nodes) and prompts a user to define interactions between nodes. In one embodiment, the Nodes GUI includes a Node Definition table and a Node Interaction editor. The Node Definition table graphically presents the role bindings for the principals that are designated as NEMO nodes in the Principals GUI 50 (see FIG. 6). In the example of FIG. 8, the role bindings are presented as either client or service role bindings based on the role relationships that were defined in the Invokers matrix described with reference to FIG. 3. For example, the list of available client and/or service bindings for a given node can be based on a set of SAML assertions that a principal has, and the roles those assertions define. In turn, in this example, the roles that can be used in client binding, in service bindings, or both, depends on the Invokers matrix (recall that in one embodiment the same role can be defined in the Invokers matrix both as "requester" and "responder"). As used herein, the term "node" generally refers to a principal that engage in interactions with other nodes (e.g., using its credentials).

Further, in a preferred embodiment, the trust management editor allows nodes to be configured for specific roles only if their corresponding principals were configured with the corresponding role assertions. Both of these features ensure that a self-consistent configuration is being established.

In one embodiment, each service or client role binding refers to one of the principal's role assertions. Once instantiated, a service role binding is automatically pre-populated with service bindings for each service defined earlier for the given role. In one embodiment, service bindings can be modified, but not removed or added, for that would constitute a breach of the role contract. As described above with regard to FIG. 5, the Services GUI 40 defines the services that need to be exposed for a node acting in a given role. In one embodiment, once a "service role binding" is added for a given role "X", for a given node under the Nodes GUI 60, the following assertions are made: a) the node has a SAML assertion defining role "X" (verified automatically); b) the role "X" is mentioned at least once in the "Invokers" matrix as a "responder role" (verified automatically); and c) the node intends to use this SAML assertion to provide services to other nodes. In one embodiment, the role contract says that by accepting the service role "X", the node must provide all services defined under the Services GUI for a given role "X", not just their subset. It is enforced in the Nodes GUI by auto-populating a fixed list of all service bindings for a given role "X".

In one embodiment, each client role binding is automatically pre-populated with client bindings for each service that the client with the given role should be able to invoke. In one embodiment, pre-population of the role bindings involves: a) from the Invokers matrix, find all tuples where the role "X" is a "requester role" and create a list of all "responder roles"; b) from the Services GUI 40, for each "responder role," get the list of services; and c) combine all services lists into one big list—this is the list of all client bindings. In one embodiment, there is no such thing as a "Client Contract". That is, just because a node can act in a client role "X", does not mean that the node must contact all services that the node is able to contact with the given client role. Being able to issue requests of the given types is a capability, while being able to respond to requests of the given types at any time is an obligation. For example, the roles (and therefore the services) that a client is able to invoke are defined via the roles Invokers matrix 34 described above with reference to FIG. 3.

In one embodiment, each client or service binding is defined in terms of the following characteristics:

Role Assertion—the name of the corresponding role assertion identified in the Principals GUI 50;

Service type—for a service binding the field identifies the type of exposed service, whereas for a client binding this field identifies the service that can be invoked by a given client;

Integrity Cert—the name of the certificate that is used for message signing;

Confidentiality Cert—the name of the certificate that is used for message encryption;

Messaging TA (Trust Anchor)—the trust anchor certificate defined for one of the certificate authority principals, to be used for validating the peer's certificates for message signing and/or encryption;

Attribute TA (Trust Anchor)—the trust anchor certificate defined for one of the certificate authority principals, to be used to validate the peer's role signing certificates Trusted AA (Attribute Assertion) Cert—certificate of the principal, which is trusted with issuing peer's roles.

In the embodiment of FIG. 8, the Nodes GUI 60 organizes the nodes, service role bindings, and client role bindings in a hierarchical manner using folders and subfolders to graphically represent the relationships between the various nodes and their corresponding role bindings. The graphical representation of the relationships between nodes, service role bindings, client role bindings and the associated role binding characteristics makes the trust management editor more user friendly than having to read through lines of configuration code to decipher similar relationships and characteristics.

In addition to listing all the client and service bindings, in one embodiment the Nodes GUI 60 defines trust management policies for each of those bindings. Each client or service binding defines: a) what assertion to use to prove one's role (automatically inherited from the parent role binding); b) what certificate to use for message signing, c) what certificate to use for message encryption; d) what trust anchor certificate to use to validate message certificates of other nodes that are interacted with (Messaging Trust Anchor, or MTA); e) what trust anchor certificate to use to validate role assertions signing certificates (Attribute Trust Anchor, or ATA); and f) who is the trusted role assertions signer, by name (Trusted Attribute Authority, or TAA). In one embodiment, TM is optional. Often, as long as one can authenticate a role assertion signer TAA using ATA, the TAA is trusted. In one embodiment, the nodes GUI presents only valid certificate choices: encryption and signing certificates must be the ones of a given principal (one can only use its own certificates to sign or encrypt its own messages), plus they must have corresponding key usages (128 for signing and 32 for encryption). MTA and ATA should be any certificate of another principal with the key usage 4, for certificates signing. TAA should be any certificate with data signing key usage 128, additionally marked as "attribute authority" in the "Principals" GUI.

The Node Interaction editor at the bottom of the Nodes GUI 60 allows a user to enumerate node role binding pairs that should invoke each other. In one embodiment, the trust management engine checks whether each client binding configured under a specific requester node's role binding will be able to invoke corresponding service bindings configured under a given role binding of the responder node, where "being able to invoke" refers to compatibility of credentials configured for each node's bindings with their corresponding trust management policies. In one embodiment, the user is immediately notified if an enumerated role binding pair is invalid. In one embodiment, the configuration editor determines the validity of a role binding pair by checking the compatibility of the assigned credentials. For example, in one embodiment, for each interaction pair {client role binding A, service role binding B}, the following is verified: a) messaging trust anchor (MTA) certificate defined for binding A should be an ancestor of both signing and encryption certificates used in binding B—and visa versa; and b) Attribute trust anchor (ATA) defined for binding A should be an ancestor of a signer of the role assertion used in binding B—and visa versa. In the embodiment of FIG. 8, a configuration status window in the Nodes GUI provides an indication of the validity of the configuration. If the configuration is invalid, an indication of the configuration error is displayed in the configuration status window.

Referring once again to the Nodes GUI 60 of FIG. 8, while working on the configuration, it is possible to view the underlying XML representation of the created configuration at any point by choosing the XML tab 28. While the presented XML document is editable, direct altering of it is not recommended, because it typically requires knowledge of the underlying schema.

Once the network configuration is completed and the configuration status window indicates that the configuration is valid, the configuration process is complete. The configuration can be saved on a local file system for future reference. At this point implementers can continue the configuration wizard in order to generate the implementation project.

The configuration tool described herein simplifies the configuration of a trust management framework for use with web services, digital right management, and/or other applications. The configuration of the trust management framework is constantly validated for consistency and can be saved for future reference.

Figure 9:
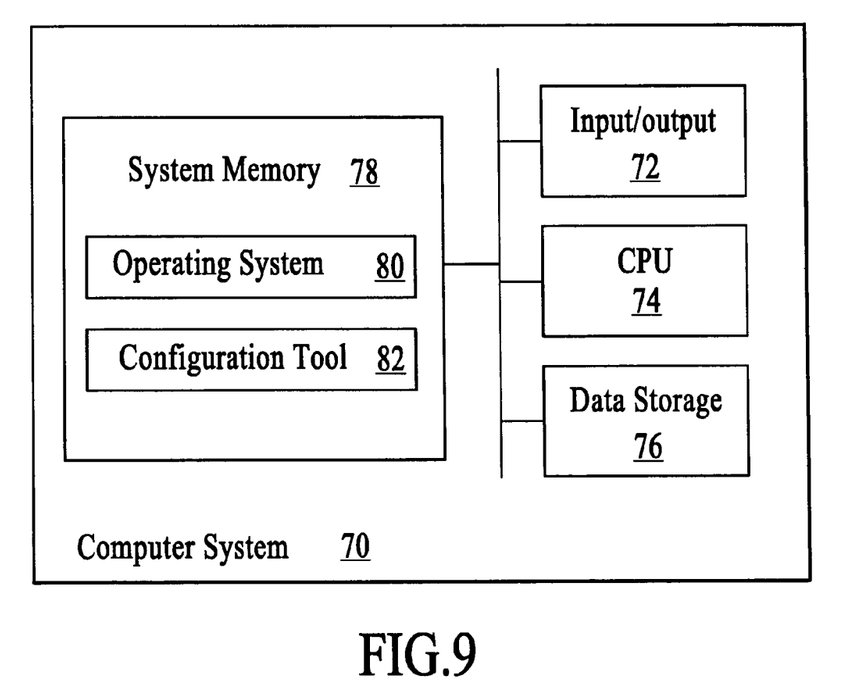
FIG. 9 depicts an illustrative computer system for practicing embodiments of the configuration tool.

FIG. 9 depicts an illustrative computer system 70 for practicing embodiments of the configuration tool. The computer system includes an input/output 72, a central processing unit (CPU) 74, data storage 76, and system memory 78. The input/output includes, for example, a display and/or a keyboard. The CPU includes a conventional multifunction processor as is known in the field. The data storage includes, for example, a magnetic disk and/or an optical disk, and/or any other suitable storage means. The data storage may be fixed or removable as is know in the field. The system memory may include, for example, some combination of random access memory (RAM) and read only memory (ROM) for storing information and instructions to be executed or used by the CPU and/or for storing temporary variables or other intermediate information during execution of instructions by the processor. In the embodiment of FIG. 9, the system memory stores an operating system 80 and the above-described configuration tool 82. It should be understood, however, that FIG. 9 is provided for purposes of illustration, not limitation, and that other computer systems with additional components and/or some suitable subset of the components illustrated in FIG. 9 could also be used. Indeed one skilled in the art will appreciate that virtually any type of computing system can be used, including, for example, personal computers and mainframes.

Figure 10:
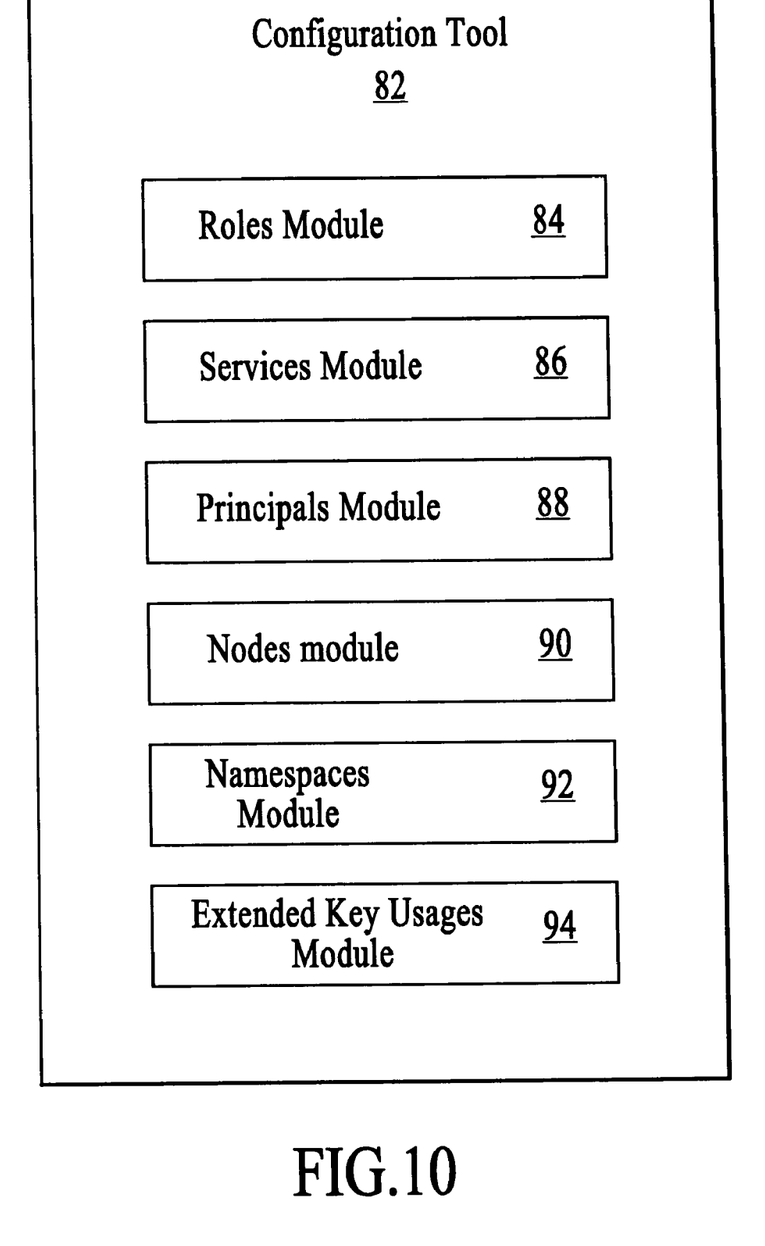
FIG. 10 depicts an expanded view of the configuration tool from FIG. 9.

FIG. 10 depicts an expanded view of the configuration tool 82 from FIG. 9. In the example shown in FIG. 10, the configuration tool includes a roles module 84, a services module 86, a principals module 88, and a nodes module 90. In one embodiment, each module includes executable instructions for performing a function that corresponds to the above-described function-specific GUIs. The configuration tool also includes a namespaces module 92 and an extended key usages module 94. The namespaces module includes executable instructions for implementing the namespaces editor as described above with reference to FIG. 4 and the extended key usages module includes executable instructions for implementing the extended key editor as described above with reference to FIG. 7.

Although the function-specific GUIs are described as being displayed in separate screen views, the function-specific GUIs can be presented simultaneously in different combinations. Further, although specific layouts of the GUIs are provided, other layouts are possible.

Figure 11:
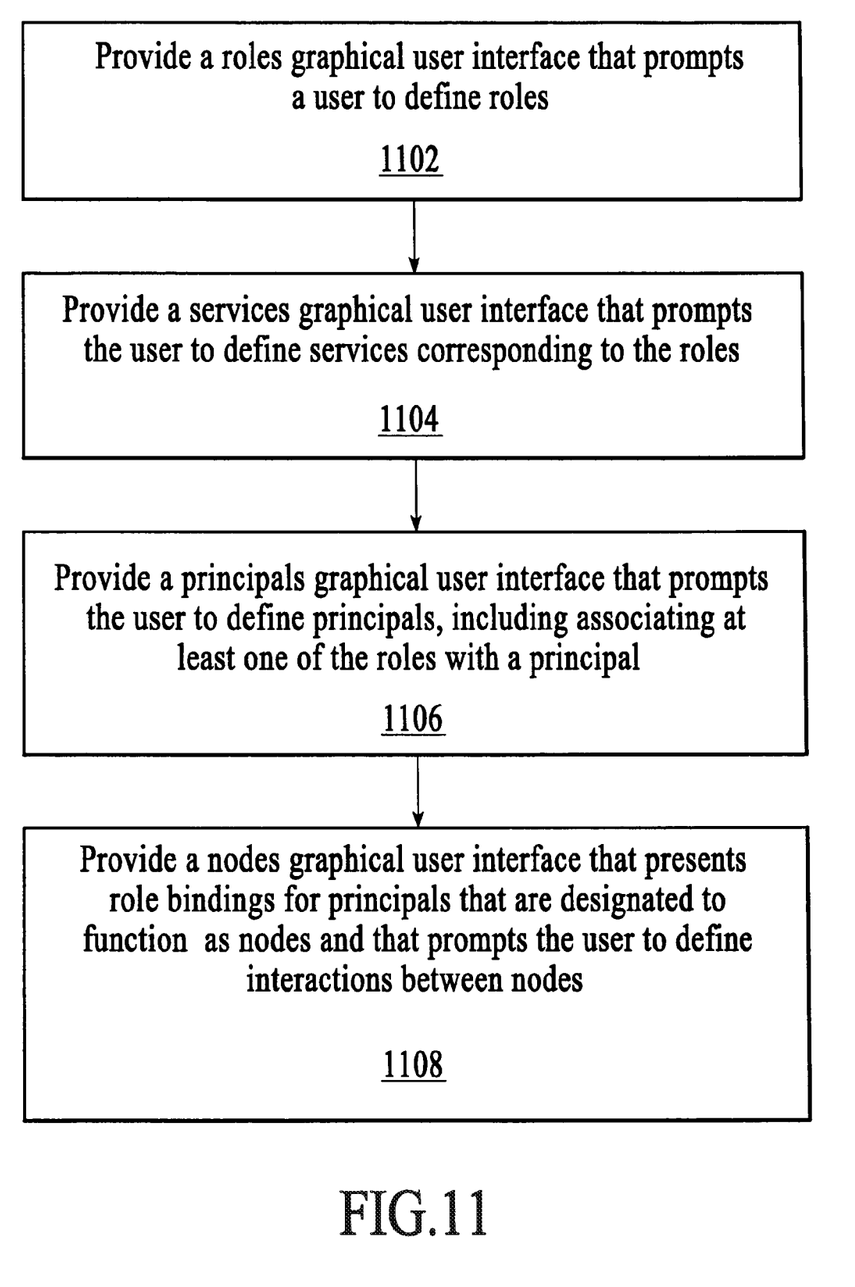
FIG. 11 is a process flow diagram of a method for configuring a trust management framework in accordance with one embodiment.

FIG. 11 is a process flow diagram of a method for configuring a trust management framework in accordance with one embodiment. At block 1102, a Roles GUI that prompts a user to define roles is provided. At block 1104, a Services GUI that prompts the user to define services corresponding to the roles is provided. At block 1106, a Principals GUI that prompts the user to define principals, including associating at least one of the roles with a principal is provided. At block 1108, a Nodes GUI that presents role bindings for principals that are designated to function as nodes and that prompts the user to define interactions between nodes is provided.

The process of configuring a trust management framework may include the configuration of a new trust management framework or the modification of a previously configured trust management framework.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive.

What is claimed is:

1. A method for configuring a trust management framework for use in a network environment, executed by a processor programmed to execute instructions to perform the method, the method comprising:
   providing, using the processor, a roles graphical user interface that prompts a user to define roles;
   providing, using the processor, a services graphical user interface that prompts the user to define services corresponding to roles defined using the roles graphical interface, wherein the service graphical user interface provides a graphical representation of a relationship between defined roles and corresponding services, and corresponding operations and trust management messaging characteristics associated with the corresponding services in a hierarchical manner;
   providing, using the processor, a principals graphical user interface that prompts the user to define principals of the trust management framework, including associating at least one of the roles, defined using the roles graphical interface, with a principal; and
   providing, using the processor, a nodes graphical user interface that presents role bindings for principals that are designated to function as nodes and that prompts the user to define interactions between nodes.

2. The method of claim 1 wherein providing a roles graphical user interface comprises providing a graphical user interface that prompts a user to identify role names and to identify interactions between the roles.

3. The method of claim 1 wherein providing a roles graphical user interface comprises providing a graphical user interface that prompts a user to identify role names and to identify which roles can be invoked by which roles.

4. The method of claim 3 wherein the roles graphical user interface presents the role names in a matrix with requester roles on one axis of the matrix and responder roles on another axis of the matrix.

5. The method of claim 4 wherein interactions between roles are identified by marking the intersection point between a requestor role and a responder role in the matrix.

6. The method of claim 5 wherein a mark at the intersection point between a requestor role and a responder role indicates that the marked requester role can invoke the marked responder role.

7. The method of claim 6 wherein the roles graphical user interface is configured to place each identified role name on each axis of the matrix.

8. The method of claim 1 wherein providing a roles graphical user interface comprises providing a graphical user interface that prompts a user to identify role names and to identify which roles can assert which roles.

9. The method of claim 1 wherein the services graphical user interface prompts a user to identify a name for a service and to identify at least one operation associated with the service.

10. The method of claim 9 wherein identifying at least one operation associated with the service comprises defining a message protocol.

11. The method of claim 10 wherein defining a message protocol comprises at least one of:
    indicating an XML schema type of a message;
    indicating whether or not a message must be integrity protected;
    indicating whether or not a message must be confidential;
    indicating whether or not a message must be time-stamped; and
    indicating whether or not a message must include a nonce.

12. The method of claim 10 further comprising providing a namespace graphical user interface that prompts a user to define namespaces for schema types of messages associated with the services.

13. The method of claim 9 wherein the services graphical user interface is automatically populated with the roles that are identified in the roles graphical user interface and wherein the services are associated with roles.

14. The method of claim 1 wherein the principals graphical user interface prompts the user to identify a principal name and a universal resource name (URN) for each principal.

15. The method of claim 13 wherein the principals graphical user interface prompts a user to identify whether or not each principal is imported from an external source.

16. The method of claim 13 wherein the principals graphical user interface prompts the user to identify credentials related to each principal.

17. The method of claim 16 wherein the principals graphical user interface prompts a user to identify the credentials of a principal in terms of at least one of:
    an issuing principal;
    an issuing certificate;
    whether or not the principal is an attribute issuer; and
    a usage specification.

18. The method of claim 1 wherein the nodes graphical user interface presents role bindings in terms of client role bindings and service role bindings.

19. The method of claim 18 wherein, for each role binding, the nodes graphical user interface presents at least one of:
    a role assertion;
    an indication of the type of service;
    an identity of an integrity certificate;
    an identity of a confidentiality certificate;
    an identity of a messaging trust anchor;
    an identity of an attribute trust anchor; and
    an identity of a trusted attribute assertion certificate.

20. The method of claim 4 further comprising checking to see if a client role binding configured as a requestor node is able to invoke a corresponding service binding configured as a responder node.

21. The method of claim 20 wherein the nodes graphical user interface presents an indication as to whether a defined interaction between nodes is valid.

22. The method of claim 1 wherein the nodes graphical user interface presents a node interaction table that prompts a user to identify an interaction between two nodes.

23. The method of claim 22 wherein an interaction is represented in the node interaction table by identifying a requestor node, a requestor role binding, a responder node, and a responder role binding.

24. A system for configuring a trust management framework for use in a network environment, the system comprising:
- a roles module that prompts a user to define roles;
- a services module that prompts the user to define services corresponding to the roles defined using the roles module, wherein the service module provides a graphical representation of a relationship between defined roles and corresponding services, and corresponding operations and trust management messaging characteristics associated with the corresponding services in a hierarchical manner;
- a principals module that prompts the user to define principals of the trust management framework, including associating at least one of the roles, defined using the roles module, with a principal; and
- a nodes module that presents role bindings for principals that are designated to function as nodes and that prompts the user to define interactions between nodes.

25. The system of claim 24 wherein the roles module prompts a user to identify role names and to identify which roles can be invoked by which roles.

26. The system of claim 24 wherein the roles module prompts a user to identify role names and to identify which roles can assert which roles.

27. The system of claim 24 wherein the services module prompts a user to identify a name for a service and to identify at least one operation associated with the service.

28. The system of claim 27 wherein identifying at least one operation associated with the service comprises defining a message protocol, wherein defining a message protocol comprises at least one of:
- indicating an XML schema type of a message;
- indicating whether or not a message must be integrity protected;
- indicating whether or not a message must be confidential;
- indicating whether or not a message must be time-stamped; and
- indicating whether or not a message must include a nonce.

29. The system of claim 28 further comprising providing a namespace module that prompts a user to define namespaces for schema types of messages associated with the services.

30. The system of claim 24 wherein the services module automatically populates a services definition editor with the roles that are identified in the roles graphical user interface and wherein the services are associated with roles.

31. The system of claim 24 wherein the roles module is configured to check if a client role binding configured as a requestor node is able to invoke a corresponding service binding configured as a responder node.

32. The system of claim 31 wherein the nodes module presents an indication as to whether a defined interaction between nodes is valid.

33. The system of claim 24 wherein the nodes module presents a node interaction table that prompts a user to identify an interaction between two nodes, wherein an interaction is represented in the node interaction table by identifying a requestor node, a requestor role binding, a responder node, and a responder role binding and wherein the nodes module is configured to present an indication of the validity of the identified interaction.

34. A system for configuring a trust management framework for use in a network environment, the system comprising:
- means for prompting a user to define roles;
- means for prompting the user to define services corresponding to the roles defined using the means for prompting the user to define roles, wherein the means for prompting the user to define services provides a graphical representation of a relationship between defined roles and corresponding services, and corresponding operations and trust management messaging characteristics associated with the corresponding services in a hierarchical manner;
- means for prompting the user to define principals, including associating at least one of the roles with a principal of the trust management framework; and
- means for presenting role bindings for principals that are designated to function as nodes and that prompts the user to define interactions between nodes.

35. A non-transitory computer-readable medium containing executable instructions for configuring a trust management framework, the executable instructions including instructions for:
- providing a roles graphical user interface that prompts a user to define roles;
- providing a services graphical user interface that prompts the user to define services corresponding to roles defined using the roles graphical using interface, wherein the service graphical user interface provides a graphical representation of a relationship between defined roles and corresponding services, and corresponding operations and trust management messaging characteristics associated with the corresponding services in a hierarchical manner;
- providing a principals graphical user interface that prompts the user to define principals of the trust management framework, including associating at least one of the roles, defined using the roles graphical user interface, with a principal; and
- providing a nodes graphical user interface that presents role bindings for principals that are designated to function as nodes and that prompts the user to define interactions between nodes.

* * * * *